United States Patent
Hsu et al.

(10) Patent No.: US 11,881,616 B2
(45) Date of Patent: Jan. 23, 2024

(54) SMART RING

(71) Applicants: INVENTEC APPLIANCES (PUDONG) CORPORATION, Shanghai (CN); INVENTEC APPLIANCES CORP., New Taipei (CN); INVENTEC APPLIANCES (SHANGHAI) CO. LTD., Shanghai (CN)

(72) Inventors: Chun-Chieh Hsu, New Taipei (CN); Chih-Hsuan Hsiao, New Taipei (CN); Kuang-Chung Chou, New Taipei (CN)

(73) Assignees: INVENTEC APPLIANCES (PUDONG) CORPORATION, Shanghai (CN); INVENTEC APPLIANCES CORP., New Taipei (CN); INVENTEC APPLIANCES (SHANGHAI) CO. LTD., Shanghai (CN)

( * ) Notice: Subject to any disclaimer, the term of this patent is extended or adjusted under 35 U.S.C. 154(b) by 372 days.

(21) Appl. No.: 16/973,760

(22) PCT Filed: Oct. 11, 2019

(86) PCT No.: PCT/CN2019/110512
§ 371 (c)(1),
(2) Date: Dec. 9, 2020

(87) PCT Pub. No.: WO2020/114076
PCT Pub. Date: Jun. 11, 2020

(65) Prior Publication Data
US 2021/0289897 A1    Sep. 23, 2021

(30) Foreign Application Priority Data
Dec. 6, 2018 (CN) .......................... 201811483455.8

(51) Int. Cl.
*H01Q 1/38* (2006.01)
*H01Q 5/20* (2015.01)
(Continued)

(52) U.S. Cl.
CPC ............. *H01Q 1/38* (2013.01); *H01Q 1/2291* (2013.01); *H01Q 1/273* (2013.01); *H01Q 5/20* (2015.01);
(Continued)

(58) Field of Classification Search
CPC ........ H01Q 1/38; H01Q 1/2291; H01Q 1/273; H01Q 5/20; H01Q 5/328; H01Q 5/35;
(Continued)

(56) References Cited

U.S. PATENT DOCUMENTS

2010/0277383 A1*  11/2010 Autti ...................... H01Q 5/335
                                                                343/749
2016/0156603 A1    6/2016 Janik
2021/0399421 A1*  12/2021 Dai ....................... H04B 5/0075

FOREIGN PATENT DOCUMENTS

CN        2783436 Y      5/2006
CN      201431034 Y      3/2010
(Continued)

OTHER PUBLICATIONS

Translation of WO-2017219899-A1; Chen (Year: 2017).*
(Continued)

*Primary Examiner* — Renan Luque
(74) *Attorney, Agent, or Firm* — Qinghong Xu

(57) ABSTRACT

A smart ring includes an antenna chip and a metal ring used as an antenna, and the antenna chip is electrically connected to the metal ring to form an antenna circuit. The metal body of the smart ring is designed as a composition structure of the antenna circuit, that is, the antenna is integrated into the metal ring, the space for accommodating the antennas and
(Continued)

the cost for additional physical antennas are saved, and the design flexibility and the competitiveness of the product are improved. Nickel-zinc ferrite is unnecessary, which can reduce the cost. The ring can keep the radiation characteristic of the circular antenna that is not susceptible to the interference from human body. The metal body of the ring is a metal structure, which can fulfill both of strength requirement and texture requirement of the structure, and at the same time has good antenna characteristics.

8 Claims, 6 Drawing Sheets

(51) Int. Cl.
    *H01Q 7/00*     (2006.01)
    *H01Q 5/50*     (2015.01)
    *H01Q 5/328*     (2015.01)
    *H04B 5/00*     (2006.01)
    *H01Q 1/27*     (2006.01)
    *H01Q 5/35*     (2015.01)
    *H01Q 1/22*     (2006.01)
(52) U.S. Cl.
    CPC .............. *H01Q 5/328* (2015.01); *H01Q 5/35* (2015.01); *H01Q 5/50* (2015.01); *H01Q 7/00* (2013.01); *H04B 5/0031* (2013.01)
(58) Field of Classification Search
    CPC . H01Q 5/50; H01Q 7/00; H01Q 5/335; H04B 5/0031; H04B 1/385; H04B 2001/3861; A44C 9/0053
    See application file for complete search history.

(56) References Cited

FOREIGN PATENT DOCUMENTS

| | | | |
|---|---|---|---|
| CN | 102075207 | A | 5/2011 |
| CN | 103904416 | A | 7/2014 |
| CN | 104000570 | A | 8/2014 |
| CN | 104239832 | A | 12/2014 |
| CN | 204425340 | U | 6/2015 |
| CN | 105609957 | A | 5/2016 |
| CN | 206163707 | U | 5/2017 |
| CN | 206489604 | U | 9/2017 |
| CN | 206565428 | U | 10/2017 |
| CN | 107368882 | A | 11/2017 |
| CN | 207037710 | U | 2/2018 |
| CN | 107752245 | A | 3/2018 |
| CN | 207383705 | U | 5/2018 |
| CN | 207676371 | U | 7/2018 |
| CN | 108511398 | A | 9/2018 |
| CN | 108596319 | A | 9/2018 |
| CN | 207851879 | U | 9/2018 |
| CN | 108835781 | A * | 11/2018 |
| CN | 109288215 | A | 2/2019 |
| EP | 3364550 | A1 | 8/2018 |
| WO | WO-2017219899 | A1 * | 12/2017 ............. G04R 60/12 |
| WO | 2018020055 | A1 | 2/2018 |

OTHER PUBLICATIONS

Translation of CN-108835781-A; Yu (Year: 2018).*
The CN1OA issued Nov. 29, 2019 by the CNIPA.
The CN2OA issued May 29, 2020 by the CNIPA.
The CNNOA issued Nov. 18, 2020 by the CNIPA.
The ISR issued Jan. 14, 2020 by the WIPO.
The TW1OA issued Jul. 24, 2019 by the TW Office.

* cited by examiner

SMART RING

CROSS REFERENCE

This application is based upon PCT patent application No. PCT/CN2019/110512 filed on Oct. 11, 2019, which claims priority to Chinese Patent Application No. 201811483455.8, filed on Dec. 6, 2018, the entire contents of which are incorporated herein by reference.

TECHNICAL FIELD

The present disclosure relates to communication device technology, and more particularly to a smart ring.

BACKGROUND

Since health issues are attracting more and more attention, smart wearable devices have now become a new favorite in the market. Compared with the smart bracelet, the smart ring has an advantage of small size. However, the small size also brings greater challenges.

Currently, the smart rings in the market have built-in antennas, mostly additional physical antennas such as flexible circuit boards (FPC) or chips or wound coil antennas, which occupy quite large space. In the cases when the smart ring has a metal body, nickel-zinc ferrite (Ferrite) is further needed to attach around the antenna to ensure the effectiveness of the antenna in the existing technology. In the cases when the smart ring is designed to realize wireless communication function at two different operating frequency bands (for example, NFC/BT), two antennas are needed accordingly.

Currently, the smart rings in the market generally have two main applications of mobile payment and motion detection. It will be a great challenge to integrate an NFC antenna and a BT antenna of the two applications in the space of the ring.

Therefore, how to make the best use of this limited space has become the primary goal when designing the smart rings.

SUMMARY

The present disclosure provides a smart ring to make full use of the space of the smart ring and realize the wireless communication function.

In the present disclosure, the smart ring includes an antenna chip and a metal ring used as an antenna, the metal ring is electrically connected to the antenna chip to form an antenna circuit.

Since the metal body of the smart ring is designed to a composition structure of the antenna circuit, that is, the antenna and the metal ring are integrated, the space for accommodating the antennas and the cost for additional physical antennas are saved, and the design flexibility and the competitiveness of the product are improved. There is no need to use nickel-zinc ferrite (Ferrite) to shield the metal body, which can reduce the cost. The structure of the ring itself can keep the radiation characteristic of the circular antenna that is not susceptible to the interference from human body. The body of the ring is a metal structure, which can fulfill both of strength requirement and texture requirement of the structure, and at the same time has good antenna characteristics.

A further improvement of the smart ring of the present disclosure is that an opening is provided on the metal ring, the metal ring includes an input point and an output point, the input point and the output point are electrically connected to the antenna chip and located on two sides of the opening, respectively.

An even further improvement of the smart ring of the present disclosure is that the input point and the output point are located at two end parts of the metal ring at the opening.

An even further improvement of the smart ring of the present disclosure is that the antenna chip is located on an inner wall of the metal ring.

A further improvement of the smart ring of the present disclosure is that the smart ring includes one or more antenna chips, the antenna chips include at least one low frequency antenna chip or at least one high frequency antenna chip.

A further improvement of the smart ring of the present disclosure is that the smart ring includes a plurality of antenna chips, the antenna chips include at least one low frequency antenna chip and at least one high frequency antenna chip.

An even further improvement of the smart ring of the present disclosure is that the smart ring includes a plurality of antenna chips, the antenna chips include one low frequency antenna chip and one high frequency antenna chip.

An even further improvement of the smart ring of the present disclosure is that the low frequency antenna chip is an NFC chip having a positive port and a negative port, and the antenna circuit further includes: a first filter, having a first end electrically connected to the positive port of the NFC chip and a second end; and a second filter, having a first end electrically connected to the second end of the first filter through the metal ring and a second end electrically connected to the negative port of the NFC chip.

An even further improvement of the smart ring of the present disclosure is that the high frequency antenna chip is a BT chip, and the antenna circuit further includes: a third filter, having a first end electrically connected to the BT chip and a second end; and a fourth filter, having a first end electrically connected to the second end of the third filter through the metal ring and a second end grounded.

An even further improvement of the smart ring of the present disclosure is that the second end of the third filter is further electrically connected to the second end of the first filter, and the first end of the fourth filter is further electrically connected to the first end of the second filter.

DETAILED DESCRIPTION

The present disclosure provides a smart ring to make full use of the space of the smart ring and realize the wireless communication function.

In the following, the smart ring of the present disclosure will be described in detail with reference to the drawings and embodiments. Those skilled in the art can easily understand other advantages and effects of the present disclosure from the contents disclosed in this specification.

Figure 1:
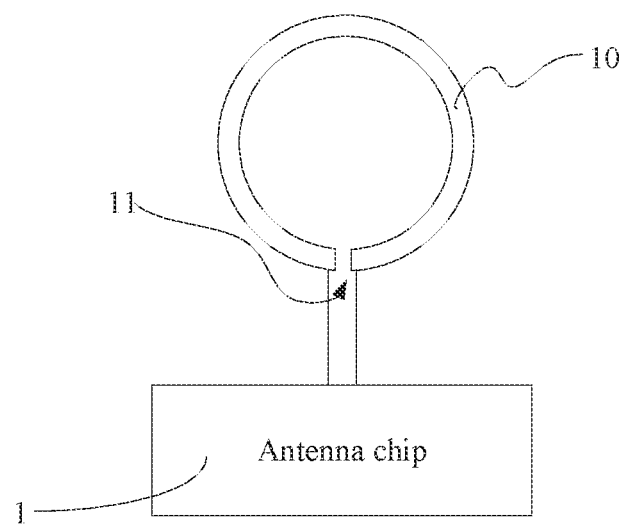
FIG. 1 is a schematic diagram of the circuit connection relationship between a metal ring and an antenna chip of a smart ring according to a first embodiment of the present disclosure.

As shown in FIG. 1, in the present disclosure, the smart ring includes an antenna chip 1 and a metal ring 10 used as an antenna, the metal ring 10 is electrically connected to the antenna chip 1 to form an antenna circuit.

Since the metal body of the smart ring is designed to a composition structure of the antenna circuit, that is, the antenna and the metal ring 10 are integrated, the space for accommodating the antennas and the cost for additional physical antennas are saved, and the design flexibility and the competitiveness of the product are improved. There is no need to use nickel-zinc ferrite (Ferrite) to shield the metal body, which can reduce the cost. The structure of the ring itself can keep the radiation characteristic of the circular antenna that is not susceptible to the interference from human body. The body of the ring is a metal structure, which can fulfill both of strength requirement and texture requirement of the structure, and at the same time has good antenna characteristics.

The metal ring 10 is electrically connected to the antenna chip 1 to form an antenna circuit. The antenna chip 1 generates an antenna signal and transmits the signal to the metal ring 10.

Furthermore, the metal ring 10 is provided with an opening 11. The metal ring 10 is provided with an input point and an output point. The input point and the output point are both electrically connected to the antenna chip 1 and located on two sides of the opening 11, respectively.

In the cases without the opening 11, that is, the cases with the metal ring 10 in a closed shape, the near-field electromagnetic coupling effect of the antenna will be poorer. In the present disclosure, with the opening 11 provided on the metal ring 10, the near-field electromagnetic coupling effect can be enhanced to improve the antenna characteristics.

In addition, with the opening 11 provided on the metal ring 10, the path of the antenna signal resonance is limited, and the limited perimeter of the metal ring 10 can be best utilized. Since the total length of the metal ring 10 is limited, the opening is provided and the positions of the input point and the output point are selected, the continuous length between the input point and the output point of the metal ring 10 is larger than half of the perimeter of the metal ring 10. Therefore, the limited perimeter of the metal ring 10 can be best utilized.

Furthermore, in the first embodiment, the input point and the output point are located at the end parts of the metal ring 10 at the opening 11. Therefore, the signal resonance path between the input point and the output point is the total length of the entire metal ring 10, to make best use of the metal ring 10 and have a best antenna effect.

Figure 2:
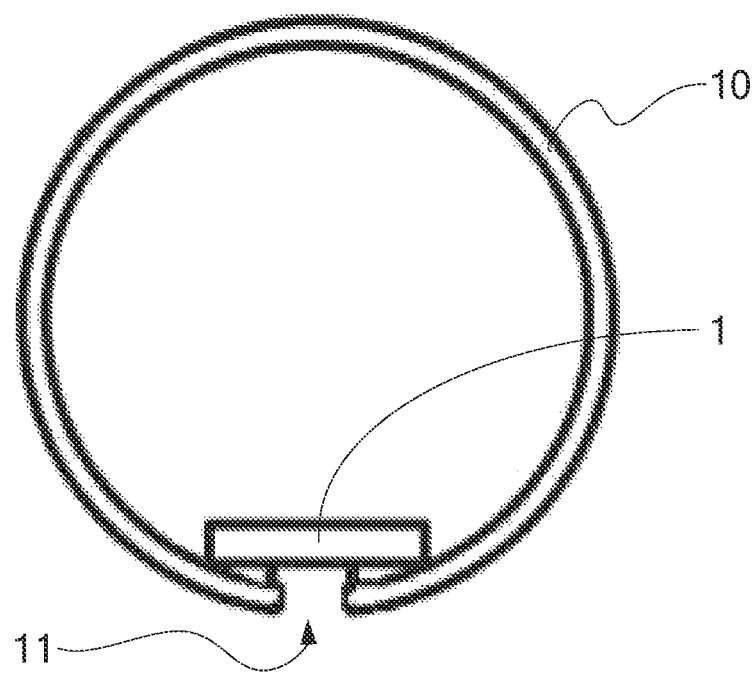
FIG. 2 is a schematic diagram of the position relationship between the metal ring and the antenna chip of the smart ring according to the first embodiment of the present disclosure.

Furthermore, as shown in FIG. 2, the antenna chip 1 is located on an inner wall of the metal ring 10.

Figure 3:
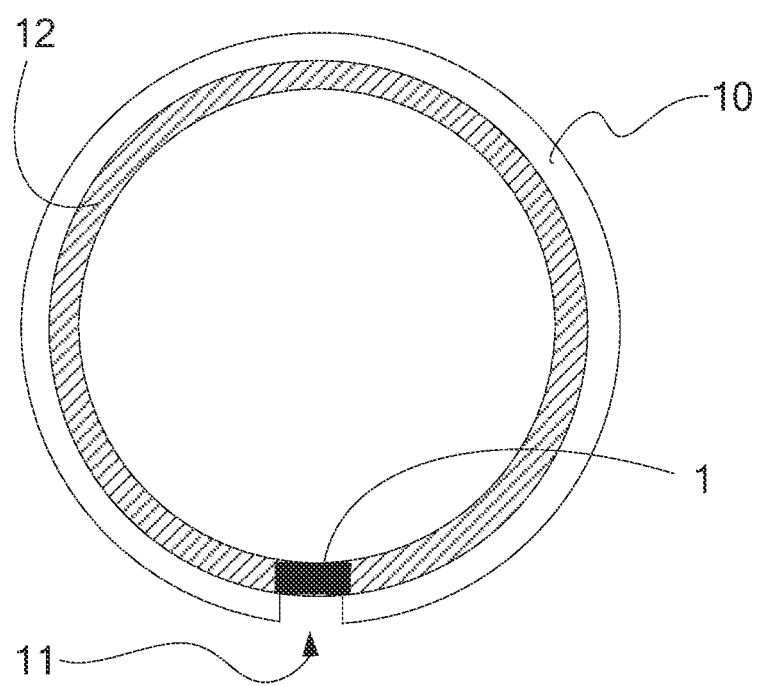
FIG. 3 is a schematic diagram of the position relationship between the metal ring, the antenna chip and an inner ring of the smart ring according to the first embodiment of the present disclosure.

As shown in FIG. 3, in the first embodiment, the antenna chip 1 is located at the opening 11. The inner wall of the metal ring 10 is provided with an inner ring 12. The antenna chip 1 is packaged inside the inner ring 12 and electrically connected to the metal ring 10 through probes, elastic sheets or pins. When using the smart ring, the inner ring 12 is sleeved outside a finger. Preferably, the inner ring 12 is made of insulating material.

Furthermore, the smart ring includes one or more antenna chips 1, the antenna chips 1 include at least one low frequency antenna chip or at least one high frequency antenna chip.

Furthermore, the smart ring includes a plurality of antenna chips 1, the antenna chips 1 include at least one low frequency antenna chip and at least one high frequency antenna chip.

Furthermore, the smart ring includes a plurality of antenna chips 1, the antenna chips 1 include one low frequency antenna chip and one high frequency antenna chip.

In the first embodiment, there are two antenna chips 1, that is, the antenna chips 1 include one low frequency antenna chip and one high frequency antenna chip.

In the present disclosure, the accommodating space saved of the smart ring can accommodate complex circuits, to enable the smart ring to realize more complex and more functions. The low frequency antenna chip (for example, the frequency is 10 MHz) is electrically connected to the metal ring 10 to realize the low frequency antenna function. The high frequency antenna chip (for example, the frequency is above 2000 MHz) is connected to the metal ring 10 to realize the high frequency antenna function. In the first embodiment, the low frequency antenna chip and the high frequency antenna chip are provided at the same time, and the metal ring 10 is used as a multifrequency shared antenna. Therefore, the smart ring has a variety of different wireless communication functions and there is no need to provide separate antennas for the different kinds of frequency. In the first embodiment, the opening is provided to realize the object of sharing the antenna. In the first embodiment, the continuous length between the input point and the output point of the metal ring 10 is the resonance path of the high frequency signal of the antenna. As the total length of the metal ring 10 is limited, the closer the input point and the output point are located to the opening 11, the closer the continuous length is to the high frequency signal wavelength, and the better the effectiveness of sharing the antenna will be.

Figure 4:
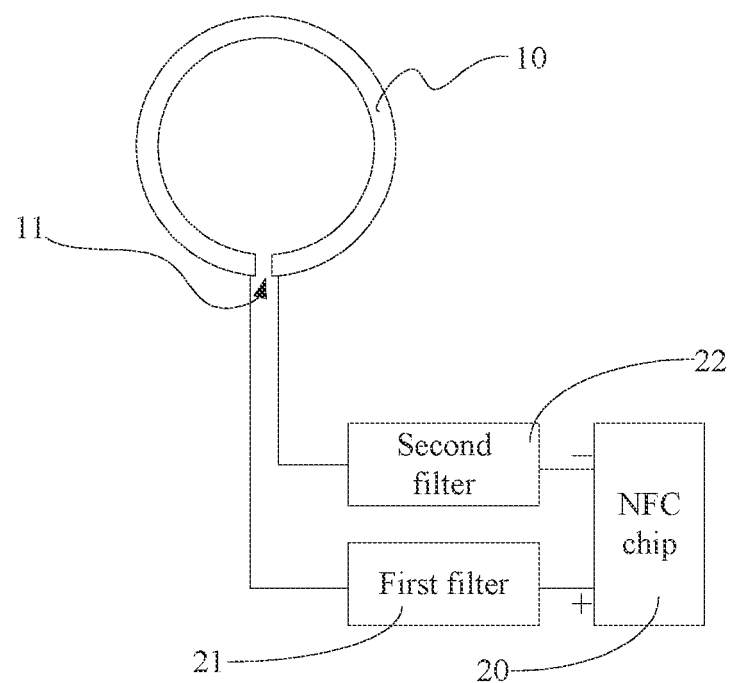
FIG. 4 is a structural schematic diagram of the circuit including the metal ring and a low frequency antenna chip of the smart ring according to the first embodiment of the present disclosure.

As shown in FIG. 4, furthermore, the low frequency antenna chip is an NFC chip 20 having a positive port and a negative port. The antenna circuit further includes a first filter 21 and a second filter 22. The positive port of the NFC chip 20 is electrically connected to the first end of the first filter 21. The second end of the first filter 21 is electrically connected to the first end of the second filter 22 through the metal ring 10. The second end of the second filter 22 is electrically connected to the negative port of the NFC chip 20. The above connection structure can realize the NFC antenna function.

Figure 5:
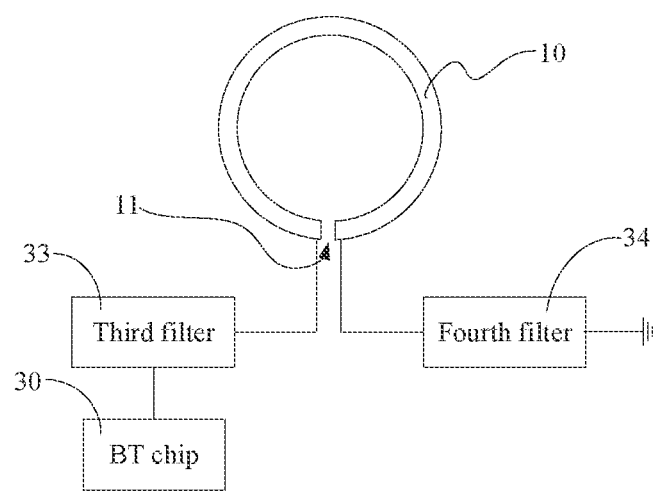
FIG. 5 is a schematic diagram of the circuit structure including the metal ring and a high frequency antenna chip in the smart ring according to the first embodiment of the present disclosure.

As shown in FIG. 5, furthermore, the high frequency antenna chip is a BT chip 30. The antenna circuit further includes a third filter 33 and a fourth filter 34. The BT chip 30 is electrically connected to a first end of the third filter 33, a second end of the third filter 33 is electrically connected to a first end of the fourth filter 34 through the metal ring 10. A second end of the fourth filter 34 is grounded. The above connection structure can realize the BT antenna function.

Figure 6:
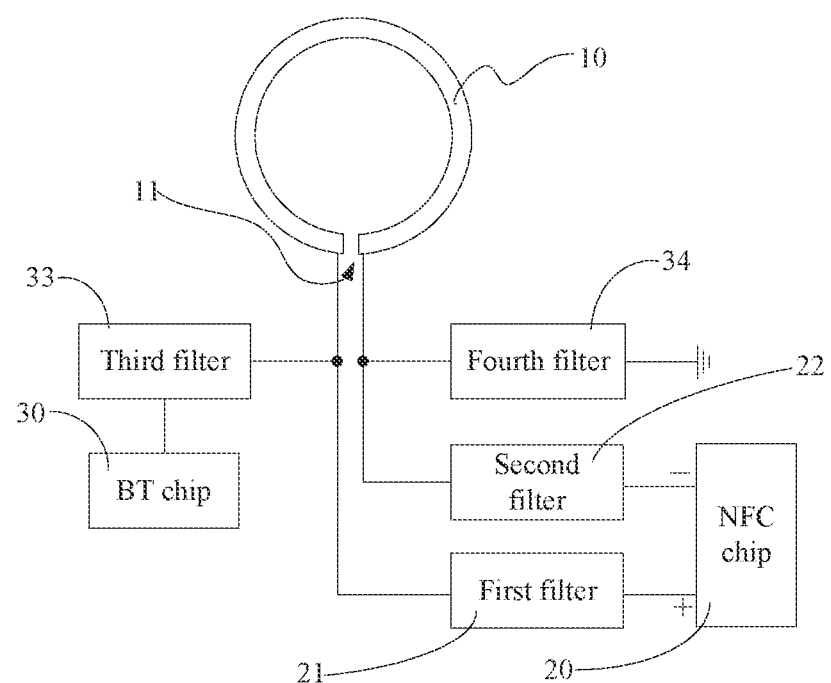
FIG. 6 is a schematic diagram of the circuit structure in the smart ring according to the first embodiment of the present disclosure.

As shown in FIG. 6, furthermore, in the first embodiment, the second end of the third filter 33 is further electrically connected to the second end of the first filter 21, the first end of the fourth filter 34 is further electrically connected to the first end of the second filter. The first filter 21 and the second filter 22 are used to shield BT signal, and allow NFC signal to pass through. The third filter 33 and the fourth filter 34 are used to shield NFC signal, and allow BT signal to pass through. Therefore, the smart ring of the present disclosure can realize the functions of the NFC antenna and the BT antenna at the same time. Preferably, the first filter 21 and the second filter 22 are both band-stop filters, the third filter 33 and the fourth filter 34 are both band-pass filters.

In the first embodiment, the antenna chips 1 include the low frequency antenna chip and the high frequency antenna chip. Taking the smart ring having the NFC function and the BT function as an example, the input end of the shared antenna is electrically connected to two branches electrically connected to the NFC circuit and the BT circuit, respectively. In the circuit, an appropriate combination of capacitances and inductances is adopted to block the interfering signal between the NFC circuit and the BT circuit. Therefore, the object of designing the metal ring 10 of the smart ring to a shared antenna is achieved.

Compared with other kinds of smart rings in the market, the present disclosure has a better NFC function and a better BT function. For the NFC function, since the single-turn structure of the present disclosure has a higher Q value, the smart ring of the present disclosure realizes a longer communication transmission distance when read under different usage scenarios. For the BT function, the smart ring of the present disclosure increases the communication transmission distance in the using frequency band of the BT function and meets general requirements of wearable products. In the present disclosure, the NFC function and the BT function are well isolated from each other in the working frequency band. Therefore, the two functions will not interfere with each other.

In the first embodiment, the high frequency antenna chip has a single-ended input, and the low frequency antenna chip has a differential input. But the present disclosure is not limited to this. The communication method is not limited to BT and NFC. One or more communication functions can be realized. The metal ring 10 can be in a shape of round, square, etc. The material of the metal ring 10 is not limited to gold, silver, copper, and iron, and any conductive material can be chosen. Non-conductive ornaments can be provided at the opening 11.

In a second embodiment, the antenna chip 1 only includes a low frequency antenna chip. The connection structure shown in FIG. 4 can be used to realize the NFC antenna function. In a third embodiment, the antenna chip 1 only includes a high frequency antenna chip. The connection structure shown in FIG. 5 can be used to realize the BT antenna function. In a fourth embodiment, the metal ring 10 is round, and a connecting line between the input point and the output point of the metal ring 10 passes through the center of the metal ring 10.

On the one hand, in the present disclosure, with the advantage of designing the metal ring 10 to the antenna, a separate physical antenna is saved, there is no need to use Ferrite to shield the metal body, the cost is reduced, the available space is increased, and the design flexibility and the competitiveness of the product are improved.

On the one hand, in the present disclosure, the technical problem in the existing technology that two kinds of communication antennas cannot be integrated for the limited space of the structure is solved. The metal ring 10 is designed to a shared antenna for the NFC function and the BT function, which is different from the existing design architecture. In the present disclosure, only one single antenna is needed to realize the normal operation of the NFC function and the BT function.

On the other hand, different from the existing design architecture, the NFC antenna realizes near field propagation in the way of electromagnetic coupling, which has a design principle apparently different from other far field antennas based on electromagnetic radiation. Therefore, it's quite difficult to integrate the NFC antenna with the BT antenna. The present disclosure solved the integration problem of the NFC antenna and the BT antenna by integrating the structure of the metal ring 10 to the shared antenna, and block the signal interference between the NFC antenna and the BT antenna through the circuit design, to achieve the object of sharing the antenna, and realize the operation of NFC function and BT function at the same time.

In addition, the design of the circular antenna is less susceptible to the interference from the human body. The metal structure body meets both of the strength requirement and the texture requirement of the mechanism, and has good antenna characteristics at the same time.

The above is only the description of preferable embodiments, and shouldn't be a limitation to the present disclosure in any form. Although the present disclosure has already been disclosed in the form of preferable embodiments above, the above is not intended to limit the present disclosure. Substitutions and modifications can be made, without departing from the technical contents of the present disclosure, and based on the above technical contents, to form equivalent embodiments. Any simple modifications, equivalent substitutions and modifications to the above embodiments, without departing from the technical contents of the present disclosure and based on the technical concept of the present disclosure, are all included in the scope of the present disclosure.

It should be noted that the structures, proportions, sizes, etc. shown in the drawings are all used for assisting the description in the specification, and for the understanding and reading by those skilled in the art, and not intended to limit the implementable conditions of the present disclosure, therefore has no technical substantive meaning. Any modification to the structures, proportions, or sizes, without influencing the effectiveness generated and the object achieved by the present disclosure, are all included in the scope covered by the technical contents of the present disclosure.

What is claimed is:

1. A smart ring, comprising:
    an antenna chip; and
    a metal ring used as an antenna and electrically connected to the antenna chip to form an antenna circuit;
    wherein, the metal ring is provided with only one opening, the metal ring comprises an input point and an output point, the input point and the output point are respectively located on two sides of the opening and electrically connected to the antenna chip, the antenna circuit further comprises a first filter and a second filter to shield high frequency signal and allow low frequency signal to pass through, the antenna circuit further comprises a third filter and a fourth filter to shield low frequency signal and allow high frequency signal to pass through;
    the antenna chip comprises at least one high frequency antenna chip, wherein the third filter has a first end electrically connected to the high frequency antenna chip and a second end, the fourth filter has a first end electrically connected to the second end of the third filter through the metal ring and a second end grounded.

2. The smart ring according to claim 1, wherein, the input point and the output point are located at two end parts of the metal ring at the opening.

3. The smart ring according to claim 1, wherein, the antenna chip is located on an inner wall of the metal ring.

4. The smart ring according to claim 1, wherein, the smart ring comprises a plurality of antenna chips, the antenna chips further comprise at least one low frequency antenna chip.

5. The smart ring according to claim 4, wherein, the smart ring comprises one low frequency antenna chip and one high frequency antenna chip.

6. The smart ring according to claim 5, wherein, the low frequency antenna chip is an NFC chip having a positive port and a negative port, the first filter has a first end electrically connected to the positive port of the NFC chip and a second end; the second filter has a first end electrically connected to the second end of the first filter through the metal ring and a second end electrically connected to the negative port of the NFC chip.

7. The smart ring according to claim 1, wherein, the high frequency antenna chip is a BT chip.

8. The smart ring according to claim 7, wherein, the second end of the third filter is further electrically connected to the second end of the first filter, and the first end of the fourth filter is further electrically connected to the first end of the second filter.

* * * * *